United States Patent
Shaw et al.

(10) Patent No.: US 11,425,439 B2
(45) Date of Patent: Aug. 23, 2022

(54) PROCESSING CONTENT STREAMING

(71) Applicant: PIKSEL, INC., Wilmington, DE (US)

(72) Inventors: Philip Shaw, York (GB); Peter Heiland, Dover, MA (US); Hans-Jurgen Maas, Mainz (DE); Sean Everett, New York, NY (US); Kristan Bullett, York (GB); Ralf Tilmann, Mannheim (DE); Miles Weaver, York (GB); Fabrice Hamaide, Paris (FR); Mark Christie, London (GB)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/736,654

(22) PCT Filed: Jun. 15, 2016

(86) PCT No.: PCT/EP2016/063799
§ 371 (c)(1),
(2) Date: Dec. 14, 2017

(87) PCT Pub. No.: WO2016/202885
PCT Pub. Date: Dec. 22, 2016

(65) Prior Publication Data
US 2018/0220165 A1    Aug. 2, 2018

Related U.S. Application Data

(60) Provisional application No. 62/175,878, filed on Jun. 15, 2015.

(51) Int. Cl.
*H04N 21/218*    (2011.01)
*H04N 21/8547*   (2011.01)
(Continued)

(52) U.S. Cl.
CPC ...... *H04N 21/26233* (2013.01); *H04H 60/46* (2013.01); *H04L 65/607* (2013.01);
(Continued)

(58) Field of Classification Search
CPC ......... H04N 21/21805; H04N 21/2187; H04N 21/4126
See application file for complete search history.

(56) References Cited

U.S. PATENT DOCUMENTS 8,214,862 B1 *  7/2012  Lee .................. H04N 21/21805
                                                     370/332
8,612,517 B1 * 12/2013  Yadid ............... H04N 21/25891
                                                     709/201
(Continued)

FOREIGN PATENT DOCUMENTS

EP    2 403 236 A1    1/2012
GB    2 486 033 A     6/2012
(Continued)

OTHER PUBLICATIONS

Wen Gao, et al., "Vlogging: A Survey of Videoblogging Technology on the Web", ACM Comput. Surv. 42, ACM, NY, NY, Jun. 23, 2010.
(Continued)

*Primary Examiner* — Brian T Pendleton
*Assistant Examiner* — Frank Johnson
(74) *Attorney, Agent, or Firm* — Holzer Patel Drennan (57) ABSTRACT

A system for providing streaming services. The system includes a plurality of users each for generating a stream of an event on a connection of a public network. The system also includes a server configured to receive a plurality of the generated streams, determine content for at least one output stream, and output the at least one output stream on a connection of a public network, with at least one user receiving the at least one output stream. The content is
(Continued)

determined based on one or more of content received from input streams, content requested by a viewer, and the user profiles of the contributors.

20 Claims, 10 Drawing Sheets

(51) Int. Cl.

| | | |
|---|---|---|
| *H04N 21/262* | (2011.01) | |
| *H04N 21/231* | (2011.01) | |
| *H04N 21/232* | (2011.01) | |
| *H04N 21/235* | (2011.01) | |
| *H04N 21/24* | (2011.01) | |
| *H04N 21/242* | (2011.01) | |
| *H04N 21/2665* | (2011.01) | |
| *H04N 21/2668* | (2011.01) | |
| *H04N 21/4223* | (2011.01) | |
| *H04N 21/4402* | (2011.01) | |
| *H04N 21/442* | (2011.01) | |
| *H04N 21/482* | (2011.01) | |
| *H04N 21/6332* | (2011.01) | |
| *H04N 21/84* | (2011.01) | |
| *H04N 21/433* | (2011.01) | |
| *H04N 21/443* | (2011.01) | |
| *H04N 21/81* | (2011.01) | |
| *H04N 21/2343* | (2011.01) | |
| *H04N 21/8358* | (2011.01) | |
| *H04N 21/414* | (2011.01) | |
| *H04N 21/43* | (2011.01) | |
| *H04N 21/2187* | (2011.01) | |
| *H04N 21/633* | (2011.01) | |
| *H04H 60/46* | (2008.01) | |
| *H04N 21/234* | (2011.01) | |
| *H04L 65/60* | (2022.01) | |
| *H04N 21/254* | (2011.01) | |
| *H04N 21/266* | (2011.01) | |
| *H04N 21/258* | (2011.01) | |

(52) U.S. Cl.
CPC ... *H04N 21/2187* (2013.01); *H04N 21/21805* (2013.01); *H04N 21/232* (2013.01); *H04N 21/235* (2013.01); *H04N 21/2343* (2013.01); *H04N 21/2353* (2013.01); *H04N 21/2358* (2013.01); *H04N 21/23106* (2013.01); *H04N 21/23418* (2013.01); *H04N 21/23439* (2013.01); *H04N 21/234336* (2013.01); *H04N 21/2402* (2013.01); *H04N 21/242* (2013.01); *H04N 21/2407* (2013.01); *H04N 21/2541* (2013.01); *H04N 21/25866* (2013.01); *H04N 21/2665* (2013.01); *H04N 21/2668* (2013.01); *H04N 21/26208* (2013.01); *H04N 21/26613* (2013.01); *H04N 21/414* (2013.01); *H04N 21/41407* (2013.01); *H04N 21/4223* (2013.01); *H04N 21/433* (2013.01); *H04N 21/4305* (2013.01); *H04N 21/4331* (2013.01); *H04N 21/4334* (2013.01); *H04N 21/43072* (2020.08); *H04N 21/44029* (2013.01); *H04N 21/4431* (2013.01); *H04N 21/44204* (2013.01); *H04N 21/440236* (2013.01); *H04N 21/440263* (2013.01); *H04N 21/4828* (2013.01); *H04N 21/633* (2013.01); *H04N 21/6332* (2013.01); *H04N 21/8186* (2013.01); *H04N 21/8358* (2013.01); *H04N 21/84* (2013.01); *H04N 21/8547* (2013.01)

(56) References Cited

U.S. PATENT DOCUMENTS

| | | | | |
|---|---|---|---|---|
| 10,674,187 | B2* | 6/2020 | Cornell | H04N 21/437 |
| 2002/0143629 | A1* | 10/2002 | Mineyama | H04H 20/81 |
| | | | | 705/14.73 |
| 2007/0035612 | A1* | 2/2007 | Korneluk | G08B 13/19671 |
| | | | | 348/14.01 |
| 2009/0009605 | A1* | 1/2009 | Ortiz | H04N 5/232 |
| | | | | 348/157 |
| 2009/0087161 | A1* | 4/2009 | Roberts | G11B 27/34 |
| | | | | 386/282 |
| 2009/0148124 | A1* | 6/2009 | Athsani | G06Q 30/02 |
| | | | | 386/241 |
| 2010/0208082 | A1* | 8/2010 | Buchner | H04H 20/18 |
| | | | | 348/207.1 |
| 2010/0225811 | A1* | 9/2010 | Konvisser | G06F 16/487 |
| | | | | 348/512 |
| 2010/0289900 | A1* | 11/2010 | Ortiz | H04N 5/232 |
| | | | | 348/159 |
| 2011/0202967 | A1* | 8/2011 | Hecht | H04N 21/854 |
| | | | | 725/114 |
| 2012/0077522 | A1* | 3/2012 | Mate | G11B 27/105 |
| | | | | 455/456.3 |
| 2012/0265621 | A1 | 10/2012 | Sechrist et al. | |
| 2012/0320013 | A1* | 12/2012 | Perez | H04N 5/91 |
| | | | | 345/207 |
| 2013/0057413 | A1* | 3/2013 | Tamarkin | G01D 4/004 |
| | | | | 340/870.02 |
| 2013/0117692 | A1* | 5/2013 | Padmanabhan | H04N 21/4586 |
| | | | | 715/753 |
| 2014/0007154 | A1 | 1/2014 | Seibold et al. | |
| 2014/0129942 | A1* | 5/2014 | Rathod | H04N 21/44222 |
| | | | | 715/720 |
| 2014/0150032 | A1* | 5/2014 | Pacor | H04N 21/21805 |
| | | | | 725/62 |
| 2014/0186004 | A1* | 7/2014 | Hamer | G11B 27/10 |
| | | | | 386/223 |
| 2014/0281011 | A1 | 9/2014 | Zarom | |
| 2015/0006637 | A1* | 1/2015 | Kangas | H04N 21/2665 |
| | | | | 709/204 |
| 2015/0015680 | A1* | 1/2015 | Wang | G11B 27/034 |
| | | | | 348/51 |
| 2015/0016661 | A1* | 1/2015 | Lord | H04N 21/2668 |
| | | | | 382/100 |
| 2015/0043892 | A1* | 2/2015 | Groman | H04N 21/47205 |
| | | | | 386/278 |
| 2015/0128174 | A1* | 5/2015 | Rango | H04N 21/21805 |
| | | | | 725/34 |
| 2015/0222815 | A1* | 8/2015 | Wang | G11B 27/031 |
| | | | | 348/36 |
| 2015/0317801 | A1* | 11/2015 | Bentley | H04N 7/181 |
| | | | | 382/107 |
| 2016/0007051 | A1* | 1/2016 | Abuelsaad | H04N 21/214 |
| | | | | 386/296 |
| 2016/0165121 | A1* | 6/2016 | Chien | H04N 5/2258 |
| | | | | 348/211.11 |
| 2016/0191591 | A1* | 6/2016 | Rider | H04L 65/00 |
| | | | | 709/219 |
| 2016/0345035 | A1* | 11/2016 | Han | H04N 21/23424 |
| 2017/0180780 | A1* | 6/2017 | Jeffries | H04N 21/4828 |
| 2018/0132011 | A1* | 5/2018 | Shichman | H04N 21/23418 |
| 2020/0280758 | A1* | 9/2020 | O'Rourkes | H04N 21/21805 |

FOREIGN PATENT DOCUMENTS

| | | |
|---|---|---|
| WO | 2007117613 A2 | 10/2007 |
| WO | 2012100114 A2 | 7/2012 |

OTHER PUBLICATIONS

International Search Report and Written Opinion for Application PCT/EP2016/063799, issued by the European Patent Office, dated Oct. 10, 2016.

(56) References Cited

OTHER PUBLICATIONS

Pereira F. et al., "Multimedia Retrieval and Delivery: Essential Metadata Challenges and Standards", Proceedings of the IEEE, New York, vol. 96, No. 4, Apr. 1, 2008.
Hesselman, Cristian, et al., "Sharing Enriched Multimedia Experiences Across Heterogeneous Network Infrastructures", IEEE Communications Magazine, vol. 48, No. 6, Jun. 1, 2010.

* cited by examiner

PROCESSING CONTENT STREAMING

BACKGROUND TO THE INVENTION

Field of the Invention

The present invention relates to an architecture in which data can be streamed and streamed data can be accessed.

Description of the Related Art

It is known in the art for data streamed from various sources, and various other sources to access streamed data. Thus capture devices may capture events for example using a video camera functionality of a mobile phone, and stream associated data. Viewing devices may receive the streamed data and vie the associated video.

It is an aim of the invention to provide an improved content streaming environment.

SUMMARY OF THE INVENTION

There is provided a system for providing streaming services, the system comprising: a plurality of users each for generating a stream of an event on a connection of a public network; and a server configured to: receive a plurality of the generated streams on connections of the public network; determine content for at least one output stream in dependence on one or more of: the content received on the input streams, the content requested by a viewer, and the user profiles of the contributors; and output the at least one output stream on a connection of a public network, at least one user for receiving the at least one output stream on a connection of the public network.

A key feature is the provision of control—the determination feature. This aspect is about multiple streams going into one output stream, but under some form of control—a decision is made. This aspect puts intelligence in the middle: the output stream uses part of the collection of input streams.

The server may include a first interface connected to the public network for receiving the plurality of the generated streams, and a second interface connected to the public network for outputting the at least one output stream. The server may be associated with a private network connected to the first and second interfaces.

The at least one of the plurality of users may provide a live stream on a connection of the public network, and the at least one output stream provided on a public network includes that live stream.

The at least one user may be one or more of: a content originator, a content consumer, a content requestor, a viewer, a contributor, a director, or a content responder. A director may be a client configured to control the output stream of the server. In general, all devices are users of the system, whether they are identified as a consumer or a client in parts of this description and/or parts of the drawings.

The at least one user may be one or more of a content requestor, an editor, an analyst, a syndicator, a curator, a moderator, an advertiser, or a content responder. The syndicator may identify input streams associated with certain events. The curator may choose specific inputs streams. The input streams may be associated with events, and the curator may choose specific events. The moderator may apply predetermined rules to the input streams.

Each user may generate a stream, each stream being allocated a timing reference. The timing reference may be relative to a master clock, an audio trigger or a visual trigger. The timing reference may be relative to a master clock, the timing reference being applied to each stream received by the server. Each stream may have one or more of a start time, a finish time and a continuity time or offset defined relative to the master clock. The timing reference may allow rights management to be applied. The timing reference may provide a time stamp on each stream generated by a user device. At least one stream may be allocated a geo-reference. The geo-reference may vary over time. The geo-reference may indicate or include a pointing direction of a camera associated with the device generating the stream. The geo-reference allocated to a stream may be updated in dependence on the device moving by a distance which is greater than a threshold. The threshold value may be set in dependence on an event. The geo-reference may be included as metadata associated with or embedded in a stream.

The server may group a plurality of input streams into an event. An input stream may be grouped into one or more events. A stream may be grouped according to its metadata.

Each consumer may be associated with an appliance. An appliance may be one of: a website, an application running on a mobile device, an application running on a television, a server application.

A server may comprise an API (application programmable interface) and a media gateway. The API may provide an interface to metadata services, and the media gateway has an interface to the streams. The media gateway may be configured to receive the input streams and generate one or more output streams. The media gateway may be configured to store the input streams. Each input stream may be allocated to an event. If it is identified that the input stream should be associated with an existing event, it is allocated to that event. If it is identified that the input stream is not associated with any existing event, then a new event is created and the input stream associated with that new event. Each input stream is allocated to an event in accordance with its metadata. The media gateway may be configured to receive data, metadata, and data with embedded metadata. The media gateway may be configured to process streamed time dependent data or metadata. The API may be configured to process data which is not time dependent.

The data may be control related. The control data is derived from metadata.

A request from a user is received by the API, and the request defines the rules which are applied to the media gateway and data streams that come into it. The rights holders may create rules that instruct the server to store content. The rights holders may assign rights to the streams.

An input stream of data and an input stream of metadata may be received by the media gateway. The media gateway may output an output stream. The media gateway may communicate with the API. The API receives control (e.g. a request), and user rules.

This provides, in an aspect, a server: determination of association with each event done by API, but then media gateway acts on it.

Static metadata includes, e.g., time. Preferably generated by originating device. Dynamic metadata includes, e.g. point of view. Preferably generated by the originating device. A password is static metadata. The media gateway is preferably only interested in data that changes with time. Static metadata goes into API.

The API may be configured to authenticate and/or authorize each input stream. The API may be configured to provide functionality associated with streaming services. The functionality may be applied to the input stream received at the media gateway in dependence on the metadata associated with the input stream.

There is provided a system for streaming data comprising: a plurality of capture devices for capturing events and generating captured data streams; a server for receiving the captured data streams and for generating at least one viewing data stream in dependence thereon, the server comprising: a media gateway for receiving the at captured data streams and for generating the at least one viewing data stream; and an application programmable interface for receiving control data associated with the captured data streams, wherein the at least one viewing stream is output by the media gateway under the control of the application programmable interface in dependence on the control data, the system further comprising: at least one viewing device for receiving the viewing data stream.

A user is enabled, on receipt of an input stream, to preferably join the input stream to an event. Such a user may also be referred to as a client.

If it is identified that the input stream should be associated with an existing event, it is joined to that event. There may be more than one streamed event.

If it is identified that the input stream is not associated with an existing event, a new event is created and it is joined to that event.

A user is enabled, on determination of provision of an invitation key or password with the input stream, to join the input stream to an associated event. Such a user may also be referred to as a client.

BRIEF DESCRIPTION OF THE FIGURES

The invention is now described by way of reference to the following figures, in which.

DESCRIPTION OF PREFERRED EMBODIMENTS

Figure 1:
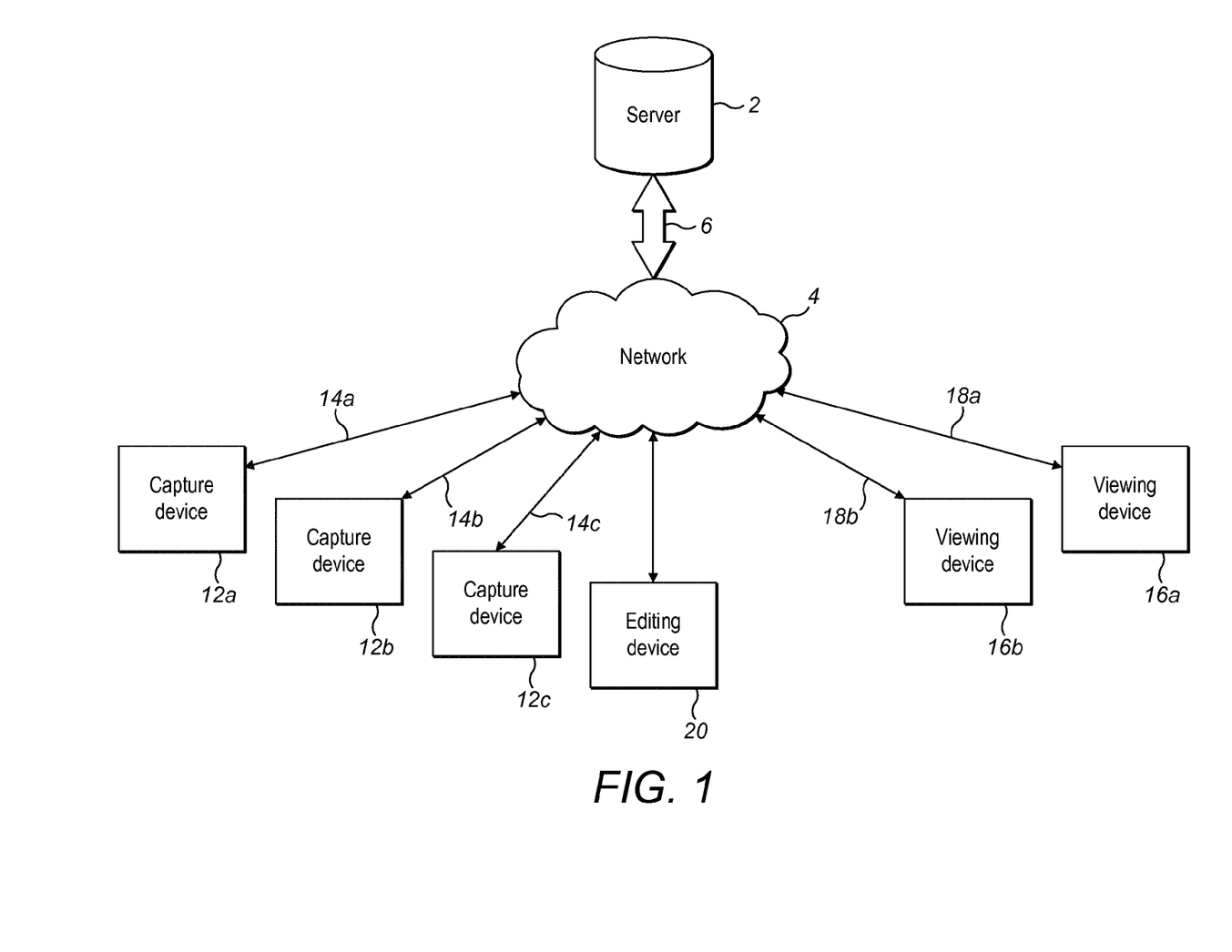
FIG. 1 illustrates an example architecture in which steaming services may be provided.

With reference to FIG. 1 there is illustrated a system architecture within which embodiments may be implemented.

With reference to FIG. 1 there is illustrated: a plurality of devices, labelled capture devices, denoted by reference numerals 12a, 12b, 12c; a plurality of devices, labelled viewing devices, denoted by reference numerals 16a, 16b; a device, labelled editing device, denoted by reference numeral 20a; a network denoted by reference numeral 4; and a server denoted by reference numeral 2.

Each of the devices 12a, 12b, 12c is referred to as a capture device as in the described embodiments of the invention the devices capture content. However the devices are not limited to capturing content, and may have other functionality and purposes. In examples each capture device 12a, 12b, 12c may be a mobile device such as a mobile phone.

Each of the capture devices 12a, 12b, 12c may capture an image utilising a preferably integrated image capture device (such as a video camera), and may thus generate a video stream on a respective communication line 14a, 14b, 14c. The respective communication lines 14a, 14b, 14c provide inputs to the network 4, which is preferably a public network such as the Internet. The communication lines 14a, 14b, 14c are illustrated as bi-directional, to show that the capture devices 12a, 12b, 12c may receive signals as well as generate signals.

The server 2 is configured to receive inputs from the capture devices 12a, 12b, 12c as denoted by the bi-directional communication lines 6, connected between the server 2 and the network 4. In embodiments, the server 2 receives a plurality of video streams from the capture devices, as the signals on lines 14a, 14b, 14c are video streams.

The server 2 may process the video streams received from the capture devices as will be discussed further hereinbelow.

The server 2 may generate further video streams on bi-directional communication line 6 to the network 4, to the bi-directional communication lines 18a, 18b, associated with the devices 16a, 16b respectively.

Each of the devices 16a, 16b is referred to as a viewing device as in the described embodiments of the invention the devices allow content to be viewed. However the devices are not limited to providing viewing of content, and may have other functionality and purposes. In examples each viewing device 16a, 16b may be a mobile device such as a mobile phone.

The viewing devices 16a and 16b may be associated with a display (preferably an integrated display) for viewing the video streams provided on the respective communication lines 18a, 18b.

A single device may be both a capture device and a viewing device. Thus, for example, a mobile phone device may be enabled in order to operate as both a capture device and a viewing device.

A device operating as a capture device may generate multiple video streams, such that a capture device such as capture device 12a may be connected to the network 4 via multiple video streams, with multiple video streams being provided on communication line 14a.

A viewing device may be arranged in order to receive multiple video streams. Thus a viewing device such as viewing device 16a may be arranged to receive multiple video streams on communication line 18a.

A single device may be a capture device providing multiple video streams and may be a viewing device receiving multiple video streams.

Each capture device and viewing device is connected to the network 4 with a bi-directional communication link, and thus one or all of the viewing devices 16A, 16B may provide a signal to the network 6 in order to provide a feedback or control signal to the server 2. The server 2 may provide control signals to the network 4 in order to provide control signals to one or more of the capture devices 12a, 12b, 12c.

The capture devices 12a, 12b, 12c are preferably independent of each other, and are independent of the server 2. Similarly the viewing devices 16a, 16b are preferably independent of each other, and are independent of the server 2.

The capture devices 12a, 12b, 12b are shown in FIG. 1 as communicating with the server 2 via a single network 4. In practice the capture devices 12a, 12b, 12c may be connected to the server 2 via multiple networks, and there may not be a common network path for the multiple capture devices to the server 2. Similarly the viewing devices 16*a*, 16*b* may be connected to the server 2 via multiple networks, and there may not be a single common network path from the server 2 to the viewing devices 16*a*, 16*b*.

The system architecture of FIG. 1 may be used to stream live content from capture devices to the server, and then for viewing devices to access the live content in streams from the server.

Figure 2:
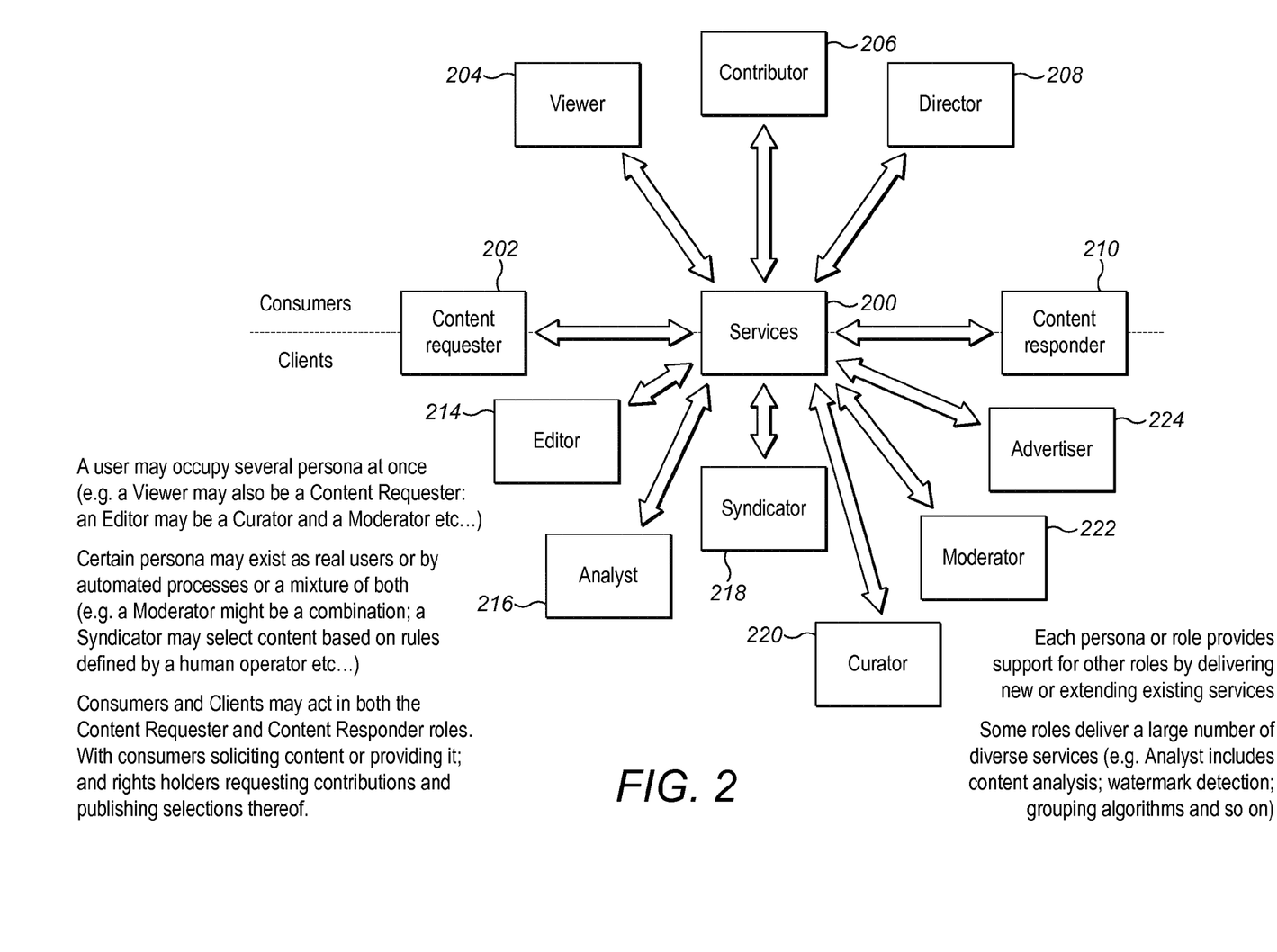
FIG. 2 illustrates further an exemplary provisions of appliances in a content streaming service.

FIG. 2 sets out examples of the 'appliances' which may be provided in a content streaming and delivery service as described. This illustrates the broad scope of appliances. There are multiple appliances in which devices have slightly different personae/roles with different rights/task/feature abilities etc. FIG. 2 is not a front-end or back-end illustration: instead it lists the various roles or personae that devices within the system have.

Each role requires various services to function and, in turn, provides new or improved services for other roles to use.

As shown in FIG. 2, services 200 may interface with users (sometimes referred to as consumers) including a viewer 204, a contributor 206, and a director 208; further users (sometimes referred to as clients) including an editor 214, an analyst 216, a syndicator 218, a curator 220, a moderator 222, and an advertiser 224; a content requester 202 which is a user which may be a consumer and/or a client; and a content responder which is a user which may be a consumer and/or a client. The different roles may be allocated to single users. For example, a single content consumers other roles may be allocated to larger clients of the presented system that are enabled with a larger set of features to control the streams.

Figure 3:
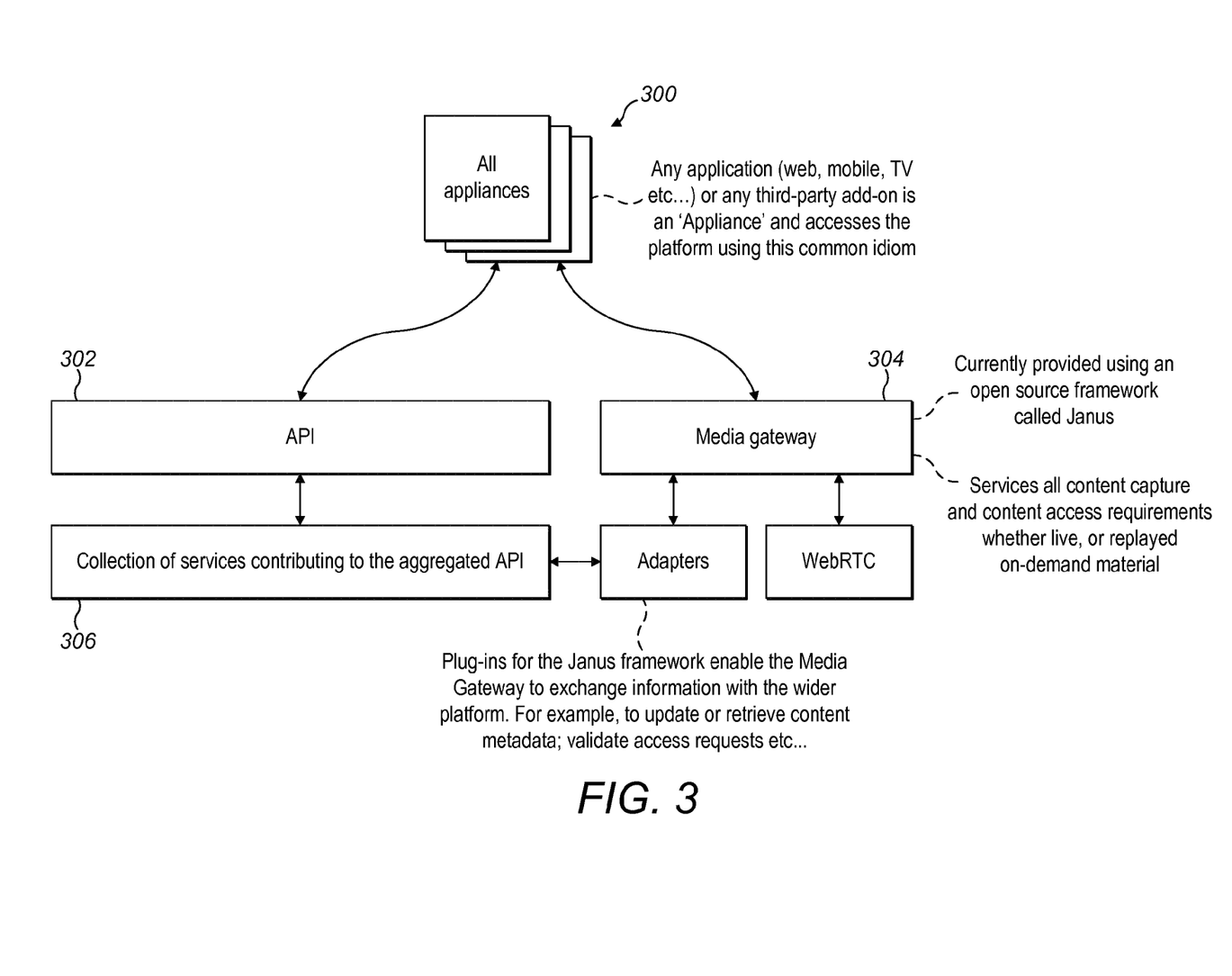
FIG. 3 illustrates an exemplary server implementation.

FIG. 3 illustrates an example top-level architecture that outlines the general structure of a platform. The core is that each feature of the system can be seen as an individual appliance based on this platform. Those different appliances could be applications on the web, smart phones, etc., but also products with different levels of feature sets. A product could be provided to a customer to manage live streams or the product that is publicity available to private users.

All of those appliances take the benefit of an aggregated API as well as a media gateway.

With further reference to FIG. 3, there is illustrated an API Aggregation architecture. FIG. 3 shows a simplified view of the platform's technical organisation. There may be a set of appliances 300 such as a consumer iOS app; a moderator's workstation app; an editor app; a consumer website etc.

Each of these applications 300 operates by interfacing with two platform end points: an API 302 and a media gateway 304.

The API 302 is an outward facing aggregation of each of the services wrapped with authentication, authorisation, load-balancing etc. This API manages the metadata of the platform: the users, the events—past, present and future—and the streams within those events; feedback; ratings; analysis of content for grouping and so on. The API 302 is shown as interfacing with a collection of services contributing to the aggregated API, as denoted by reference numeral 306.

The media gateway 304 manages the flow of the media itself from capture to playback and recording. Imagine the application as being a water utility company: the media gateway is the pipes through which the water flows; while the API 302 is the management, planning, customer and oversight function.

The media gateway 304 is shown as communicating with adapters 308 and a WebRTC 310, with the adapters 308 also being in communication with the API 302.

Figure 4:
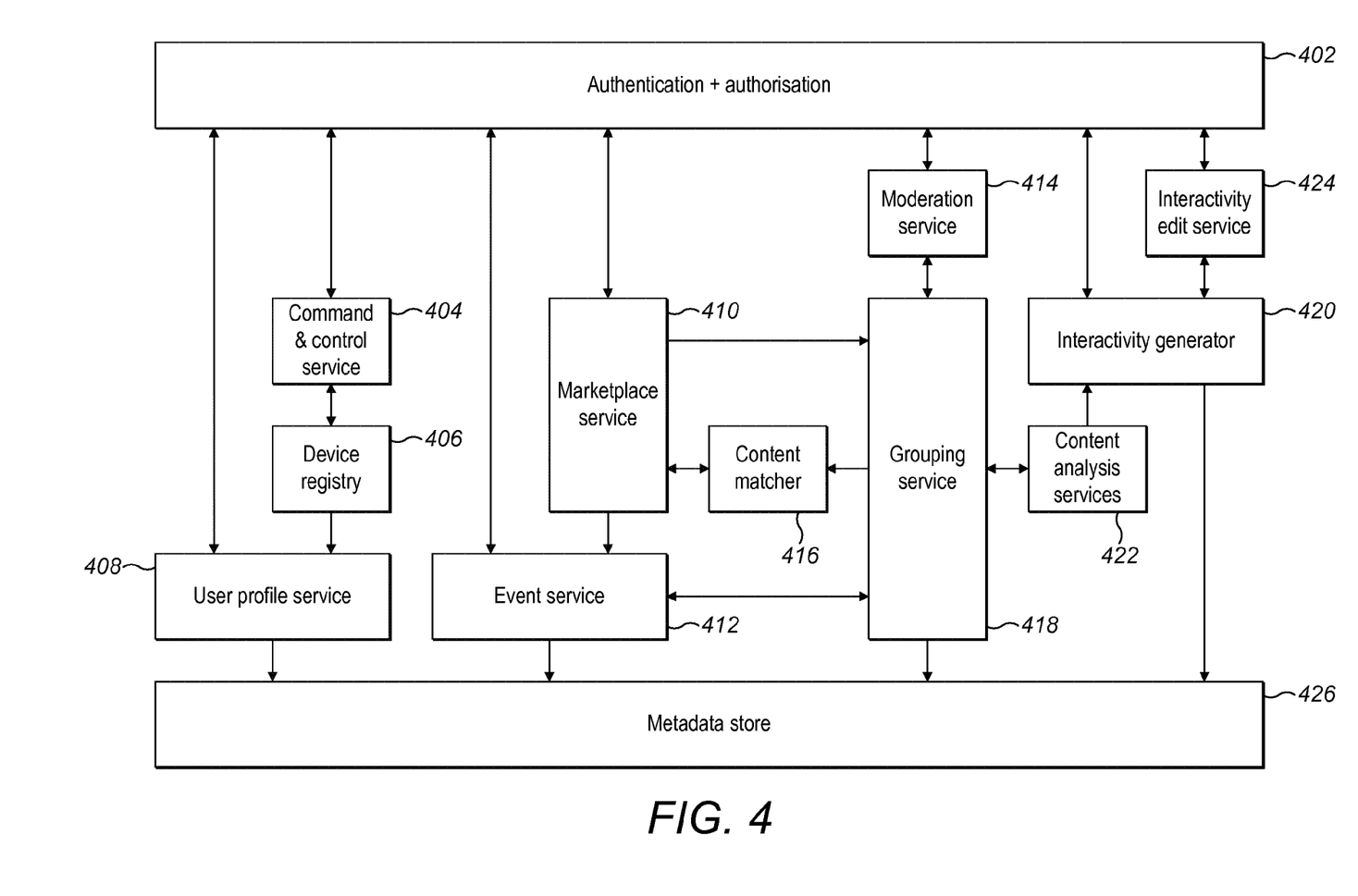
FIG. 4 illustrates an exemplary implementation of an API.
Figure 5:
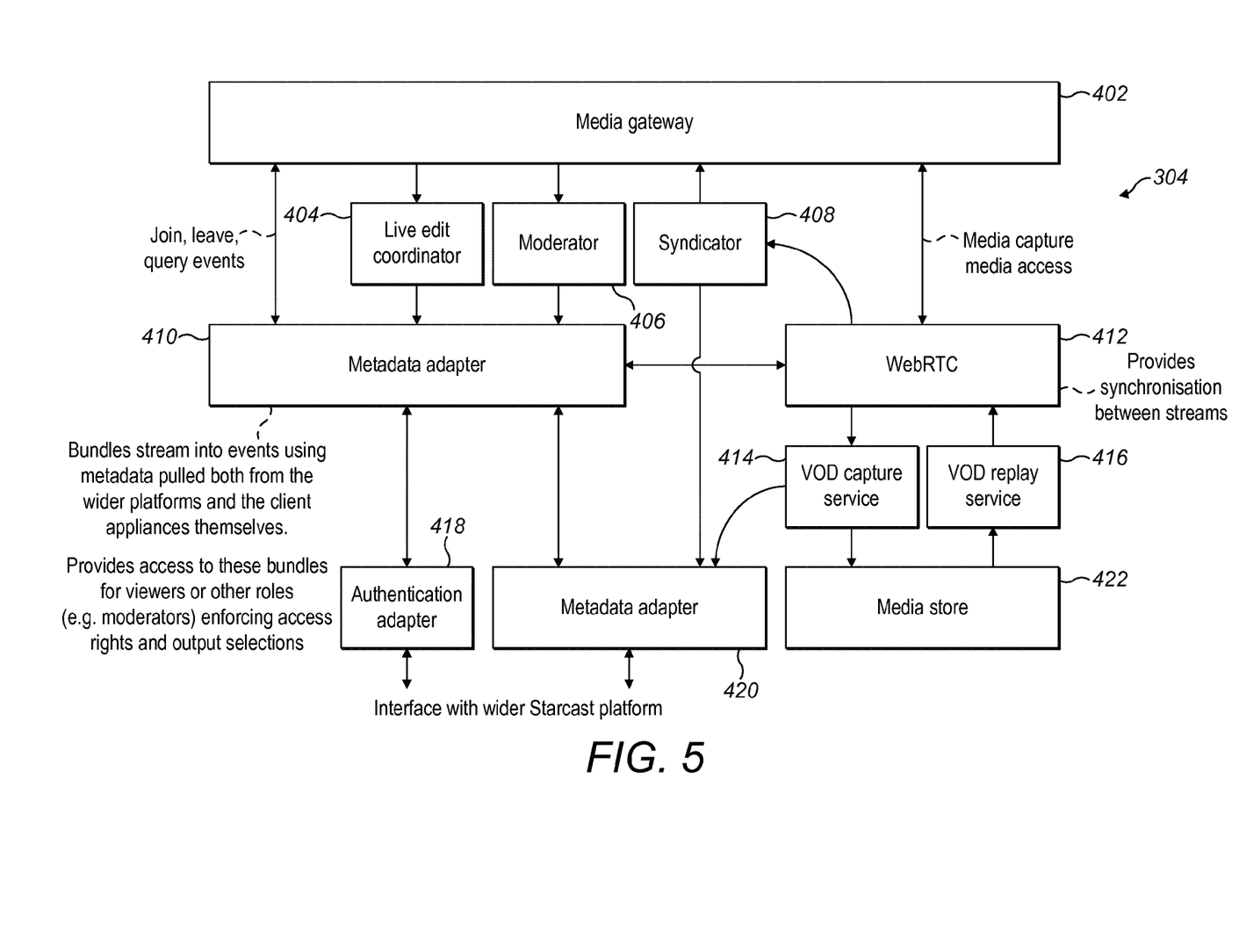
FIG. 5 illustrates an exemplary implementation of a media gateway.

FIGS. 4 and 5 illustrate the underlying structure of the API 302 and the media gateway 304.

With reference to FIG. 4, there is shown various services collected together under the API header in the 'API Aggregation'.

All access to this API is conducted through an authentication and authorisation layer 402 which sits on top.

Whereas the media gateway 304 backs onto a media store (as shown in FIG. 5), the API 302 is a series of services that derive their function from the metadata store 426. All services that wish to store persistent data do so by passing to the metadata store 426.

As shown in FIG. 4, the API 302 services include: a command and control service 404, a device registry 406, a user profile service 408, a marketplace service 410, an event service 412, a content matcher 416, a moderation service 414, a grouping service 418, an interactivity edit service 424, an interactivity generator 420, and content analysis services 422. The user profile service 408, the event service 412 and the grouping service 418 connect to the metadata store 426.

With reference to FIG. 5, the media gateway part of the platform is shown in more detail. The media gateway 304 includes a media gateway interface 402, a live event coordinator 404, a moderator 406, a syndicator 408, an event coordinator 410, a WebRTC 412, a VOD capture service 414, a VOD relay service 416, an authentication adapter 418, a metadata adapter 420, and a media store 422. The authentication adapter 418 and the metadata adapter 420 interface with the wider platform.

The WebRTC 412 provides only the means by which media is captured and distributed.

The event coordinator 410 organises this content into logical bundles by drawing on the metadata available to it through the metadata adapter 420. It is further assisted by the moderator 406 and live edit coordinator 404 which deliver the enabling features for the director, curator and moderator personae (see FIG. 2).

Figure 6:
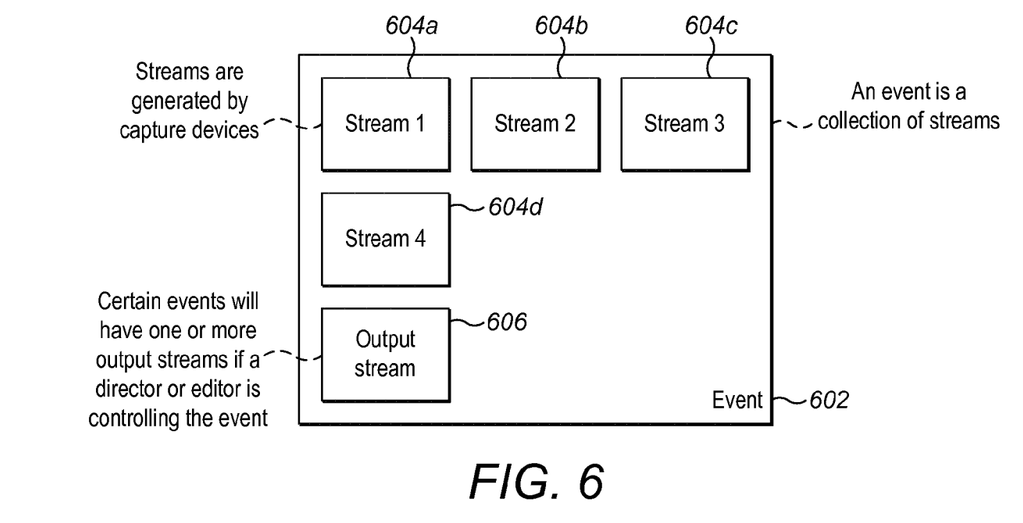
FIG. 6 illustrates an exemplary event.

With reference to FIG. 6, there is illustrated that an event 602 is a collection of streams such as the four streams 604*a* to 604*d*. Streams are generated by capture devices. Certain events will have one or more output streams, and in FIG. 6 the event 602 is shown to have an output stream 606, if a director or editor is controlling the event. In general an event is a collection of one or more streams. Every stream is allocated to an event—if a new stream starts and there is no existing event for it to join, then a new event is created and that one stream becomes the first participant.

The "unit" the platform deals with is always the event. A viewer watches an event and, within that, watches one (or more) of the contributing streams. The viewer may choose which stream from an event to watch, or a director/editor might have chosen, or might have created an output stream by editing other streams together.

Streams and events have separate metadata. An event might be 'Manchester United vs. Chelsea' but the streams might be 'Goal Camera 1, Home', 'Goal Camera 2, Away', etc.

There are separate flows for editing event/stream metadata; merging events (e.g. two people create separate events for 'Thomas' Birthday Party' but who then want to merge them into one); and marketplace content requests.

Figure 7:
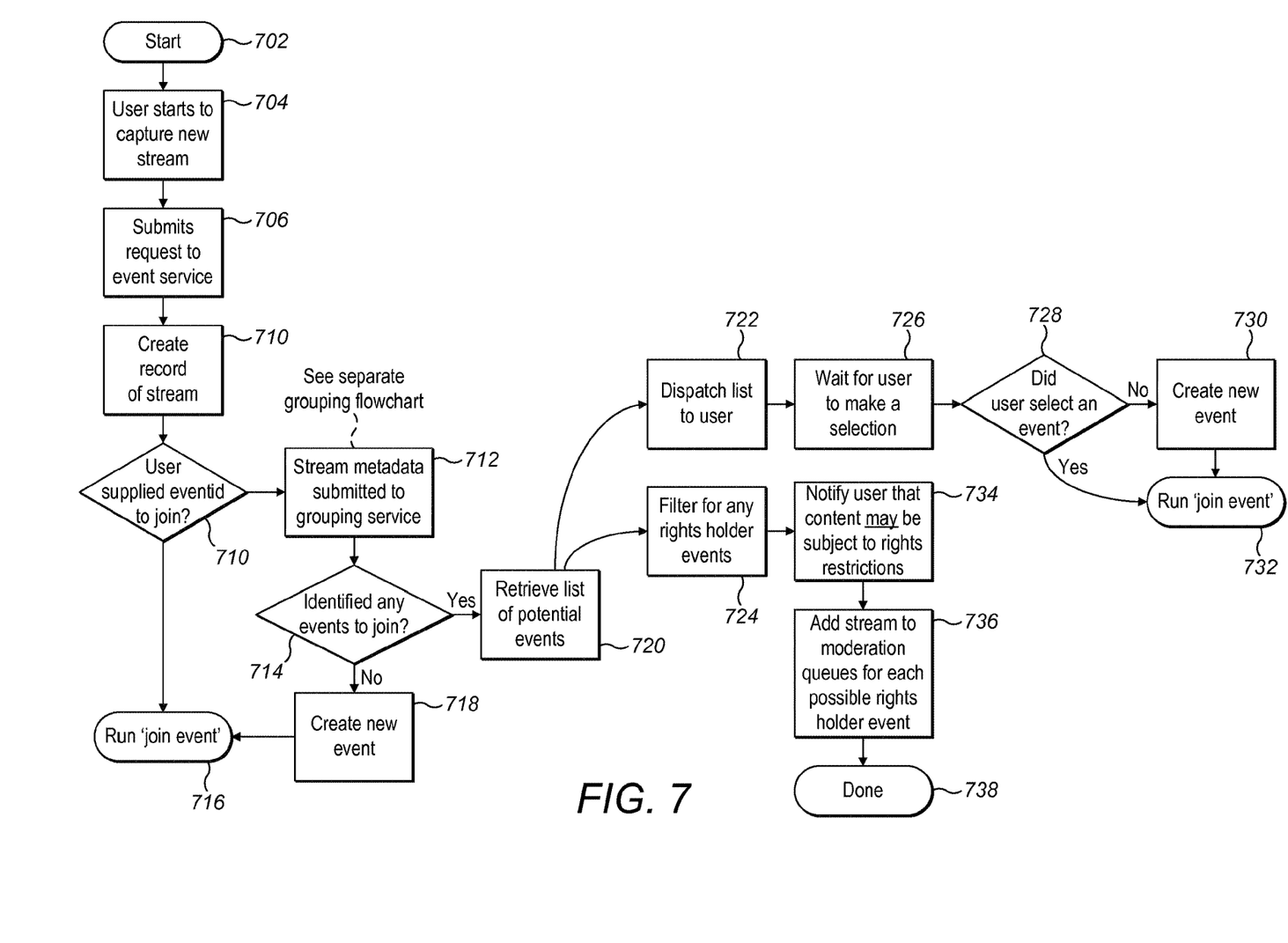
FIG. 7 illustrates an exemplary process for creating a new stream.
Figure 8:
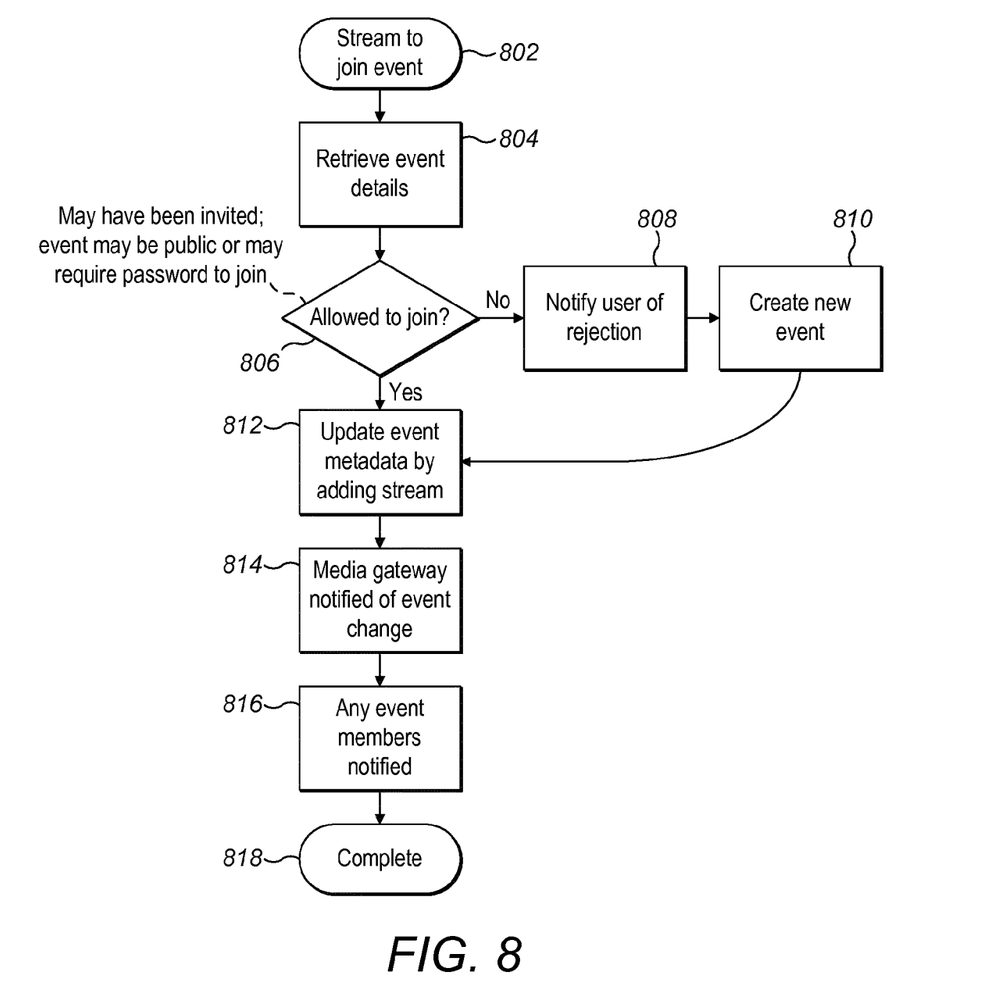
FIG. 8 illustrates an exemplary process for joining an existing event.
Figure 9:
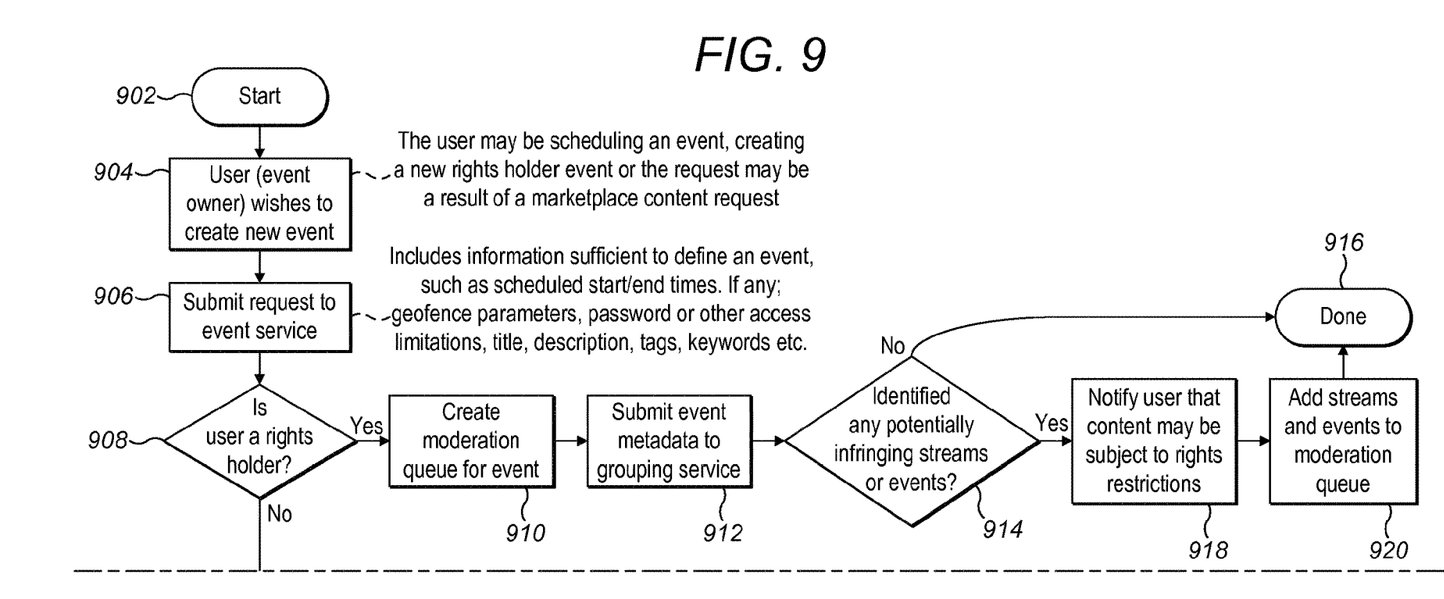
FIG. 9 illustrates an exemplary process for creating an event.

FIGS. 7 to 9 illustrate exemplary process with different appliances for different event service interactions. These illustrate examples of what occurs as a result of an appliance using the API to interact with the event service 412.

FIG. 7 illustrates an exemplary flowchart for creating a new stream, comprising steps 702 to 738.

FIG. 8 illustrates joining an existing event, comprising steps 802 to 818.

FIG. 9 illustrates creating an event, comprising steps 902 to 952.

Each step or box on each flowchart of FIGS. 7 to 9 is a simple question or a basic task. How a question is evaluated by the system or how a process is implemented is not detailed.

All the examples and embodiments described herein may be implemented as processed in software. When implemented as processes in software, the processes (or methods) may be provided as executable code which, when run on a device having computer capability, implements a process or method as described. The execute code may be stored on a computer device, or may be stored on a memory and may be connected to or downloaded to a computer device.

The invention has been described above with reference to particular examples. The invention is not limited to any particular example set out. In particular the invention may be implemented by using parts of any example described. The invention also may be implemented by combining different parts of any described example. The scope of the invention is set forth in the appended claims.

The invention claimed is:

1. A system for providing a streaming services platform, the system comprising:
   a plurality of capture devices each comprising one or more applications and/or one or more products, each application and/or product for generating a media stream on a connection of a public network; and
   a server for receiving the generated media streams on the connection of the public network and for generating at least one output stream on a connection of the public network,
   the server configured such that each individual generated media stream is allocated to an event in accordance with its metadata, and the server configured to receive a request for a new event from an event owner,
   wherein in response to the request from the event owner:
      metadata for the new event is submitted to a grouping service;
      any existing streams overlapping with the new event are identified based on the metadata for the new event, wherein if any overlapping streams are identified, then the server is further configured to:
      retrieve a list of the overlapping streams;
      send the retrieved list of overlapping streams to the event owner of the new event;
      wait for the event owner of the new event to select the identified overlapping streams to invite; and
      send an invitation to owners of the selected overlapping streams to join the new event, and
      any existing events overlapping with the new event are identified based on the metadata for the new event, wherein if any existing overlapping events are identified the server is configured to:
      retrieve a list of overlapping events;
      send the list of overlapping events to the event owner of the new event;
      wait for the event owner of the new event to select the identified overlapping streams to invite to merge; and
      send an invitation to owners of the selected overlapping events to merge with the new event.

2. The system of claim 1 wherein the server includes:
   an aggregated API comprising an aggregation of services for each application and/or product of each of the plurality of capture devices, configured to:
      manage metadata of the platform and interface with a collection of services contributing to the aggregated API;
      to authenticate or authorize, or both authenticate and authorize, each input media stream;
      to provide functionality associated with streaming services; and
      to receive using requests for one or more streams such that the aggregated API is responsible for the management and control of services, features, and functionalities; and
   a media gateway configured to manage the flow of media from receipt of the input media streams, and to generate the at least one output stream, such that the media gateway is responsible for the flow of various data between the collection of services.

3. The system of claim 2 wherein the media gateway is configured to receive data, metadata, and data with embedded metadata.

4. The system of claim 3 further comprising an aggregated API, and wherein the media gateway is further configured to process one of streamed time dependent data and metadata and the API is configured to process control related data, derived from the metadata, which is not time dependent.

5. The system of claim 3 further comprising an aggregated API, and wherein a request from a user is received by the API, and the request defines rules which are applied to the media gateway and the individual generated media streams that come into it.

6. The system of claim 5 wherein rights holders can create rules that one or both of instruct the server to store content and assign rights to the individual generated media streams.

7. The system of claim 2, wherein the server is configured, on determination of provision of one of an invitation key and a password with the individual generated media stream, to join the individual generated media stream to an associated event.

8. The system of claim 1 wherein:
   if it is determined that an individual generated media stream is associated with an existing event, the individual generated media stream is allocated to the existing event, and the metadata for the existing event is updated, and
   if it is determined that the individual generated media stream is not associated with an existing event, then metadata for a new event is created and the individual generated media stream is associated with the new event such that the created new event comprises one generated media stream.

9. The system of claim 8 wherein allocating the individual generated media stream to an existing event is dependent upon initially identifying a plurality of potential events.

10. The system of claim 9 wherein the server is further configured to subsequently receive a selection from a user associated with the individual generated media stream allocated to one of the events, and join the allocated media stream to the event.

11. The system of claim 10 wherein if the user does not select an event, the server is further configured to subsequently create a new event.

12. The system of claim 8 wherein allocating the individual generated media stream to an event is dependent upon determining if the generated media stream is allowed to join the event.

13. The system of claim 12 wherein if the individual generated media stream is not allowed to join an event, the server is further configured to create a new event.

14. The system of claim 8 wherein if the individual generated media stream is added to an event, existing event members providing input streams to the event are notified.

15. The system of claim 1 wherein the server is further configured to determine of any of the overlapping events are rights holder events, and if so to filter those rights holder events and notify the owner associated with an overlapping stream that the event may be subject to rights restrictions, and add the new event to moderation queues for each possible rights holder event.

16. The system of claim 1 wherein the server is further configured to determine if the event owner is a rights holder, and if so:
creating a moderation queue for the event; submitting the event to a metadata grouping service;
and identifying any potentially infringing streams or events, wherein if potentially infringing streams or events are identified, then: notifying the owner associated with the potentially infringing streams or events that the content may be subject to rights restrictions; and adding the potentially infringing streams or events to the moderation queue.

17. The system of claim 1 wherein when the individual generated media stream includes a request to join an identified existing event, the server is configured to:
retrieve details of the identified, existing event; and
determine if the individual generated media stream is allowed to join the identified, existing event;
responsive to the user not being allowed to join the identified, existing event, notify the use of rejection of the request to join the existing event;
responsive to the user being allowed to join the identified, existing event:
update the metadata of the identified, existing event by adding the individual generated media stream;
notify the media gateway of the change to the identified, existing event;
notify any members of the identified, existing event of the addition of the individual generated media stream; and
deliver the identified, existing event to members based on media streams allocated to that event, including the newly added individual generated media stream.

18. A method for providing a streaming services platform, the method comprising:
generating a media stream of an event from each of a plurality of capture devices, each comprising one or more applications and/or one or more products, to a connection of a public network;
receiving a plurality of the generated media streams at a server on connections of the public network and generating at least one output stream on a connection of the public network;
receiving the at least one output stream on a connection of the public network;
determining content for at least one output stream; and
allocating each of the generated media streams to an event in accordance with metadata of the generated media streams, by:
receiving a request for a new event from an event owner, wherein in response to the request from the event owner:
submitting metadata for the new event to a grouping service;
identifying any existing streams overlapping with the new event based on the metadata for the new event, wherein if any overlapping streams are identified, then the server is further configured to:
retrieving a list of the overlapping streams;
sending the retrieved list of overlapping streams to the event owner of the new event;
waiting for the event owner of the new event to select the identified overlapping streams to invite; and
sending an invitation to owners of the selected overlapping streams to join the new event, and
identifying any existing events overlapping with the new event based on the metadata for the new event, wherein if any existing overlapping events are identified the server is configured to:
retrieve a list of overlapping events;
send the list of overlapping events to the event owner of the new event;
wait for the event owner of the new event to select the identified overlapping streams to invite to merge; and
send an invitation to owners of the selected overlapping events to merge with the new event.

19. The method of claim 18 wherein the each individual generated media stream is associated with a request to join an event, the method further comprising:
providing metadata of the individual generated media stream to a grouping service;
identifying any events to join;
if any events to join are identified, then:
retrieving a list of potential events to join;
dispatching the list to a user associated with the individual generated media stream; and
waiting for the user to make a selection;
wherein if the user makes a selection then running a process to join the individual generated media stream to the selected event and wherein if the user does not make a selection then creating a new event.

20. The method of claim 18 wherein the individual generated media stream is associated with a user request to join an identified event, the method comprising:
retrieving details of the identified event; and
determining if the user generating the individual generated media stream is allowed to join a group of users associated with the identified event, wherein if the user is not allowed to join the group of users associated with the identified event: notifying the user of rejection; creating a new event; updating the new event metadata by adding the individual generated media stream; and notifying the media gateway of the new event change.

* * * * *